United States Patent [19]

Kay

[11] Patent Number: 5,983,112
[45] Date of Patent: Nov. 9, 1999

[54] FREQUENCY, TIME AND POWER LEVEL DIVERSITY SYSTEM FOR DIGITAL RADIO TELEPHONY

[75] Inventor: Stanley E. Kay, Rockville, Md.

[73] Assignee: Hughes Electronics Corporation, El Segundo, Calif.

[21] Appl. No.: 07/953,320

[22] Filed: Sep. 25, 1992

Related U.S. Application Data

[63] Continuation of application No. 07/622,243, Dec. 6, 1990, abandoned.

[51] Int. Cl.$^6$ ...................................................... H04B 7/00
[52] U.S. Cl. ............................ 455/504; 455/101; 455/59; 375/299
[58] Field of Search ................................. 455/52.1, 52.2, 455/52.3, 54.1, 54.2, 56.1, 59, 101, 127, 504, 505, 506, 517, 524; 370/50, 94.1, 95.1, 95.3; 375/51, 100, 296, 299

[56] References Cited

U.S. PATENT DOCUMENTS

| | | | |
|---|---|---|---|
| 3,125,724 | 3/1964 | Foulkes et al. | 455/101 |
| 3,523,250 | 8/1970 | Branham | 375/51 |
| 3,953,798 | 4/1976 | Sjostrand et al. | 375/51 |
| 4,128,809 | 12/1978 | Kage | 325/324 |
| 4,232,392 | 11/1980 | French | 455/52.1 X |
| 4,253,193 | 2/1981 | Kennard | 455/101 |
| 4,419,758 | 12/1983 | Dorey | 375/38 |
| 4,583,231 | 4/1986 | Puckette | 375/51 |
| 4,596,024 | 6/1986 | Thomson | 375/100 |
| 4,616,364 | 10/1986 | Lee | 375/1 |
| 4,621,368 | 11/1986 | Onoe | 375/40 |
| 4,637,937 | 1/1987 | McRae et al. | 375/100 |
| 4,809,296 | 2/1989 | Braun | 375/1 |
| 4,825,193 | 4/1989 | Siwiak et al. | 455/127 |
| 4,835,731 | 5/1989 | Nazarenko et al. | 455/14 |
| 4,868,811 | 9/1989 | Suzuki | 370/50 |
| 4,914,649 | 4/1990 | Schwendeman et al. | 370/50 |

OTHER PUBLICATIONS

Fluhr et al., "Advanced Mobile Phone Service: Control Architecture", Bell System Tech. Journal vol. 58, No. 1, Jan. 1979, pp. 43–68.

Fluhr et al, "Control Architecture", *Bell System Technical Journal*, vol. 58, No. 1, Jan. 1979, pp. 43–69.

(List continued on next page.)

*Primary Examiner*—Edward F. Urban
*Attorney, Agent, or Firm*—John T. Whelan; Michael W. Sales

[57] ABSTRACT

Multiple diversity used in a fading or shadowed error prone, framed, random access channel enhances the probability of successful transmission and reduces delays. This is important, for example, in mobile telephone service, in which traffic channels are only assigned on a speech spurt basis. Selected control messages (such as reverse allocation requests and deallocation requests) are transmitted with multiple diversity. More particularly, an identical control message is transmitted at multiple instants in time (such as three), each transmission occurring on a different carrier frequency, and each transmission occurring at a randomly selected power level.

20 Claims, 8 Drawing Sheets

OTHER PUBLICATIONS

Al-Salihi et al, "The Application of Time Assignment Speech Interpolation (TASI) to the Radiophone Service", *Colloquium on Radio System Organisation & Control*, 1980, pp. 5/1–5/5.

Campanella, "Digital Speech Interpolation", *COMSAT Technical Review*, vol. 6, No. 1, Spring 1976, pp. 127–158.

Chien et al, "Cellular Access Network (CADN): Wireless Access to Networks of the Future", *IEEE Communications Magazine*, Jun. 1987, vol. 25, No. 6, pp. 22–31.

Choudhury et al, "Diversity ALOHA—A Random Access Scheme for Satellite Communications", *IEEE Transactions on Communications*, vol. COM–31, No. 3, Mar. 1983, pp. 450–457, Comments: Su et al, vol. COM–32, No. 10, Oct. 1984, pp. 1143–1145.

Cooper et al, "Cellular Mobile Technology: The Great Multiplier", *IEEE Spectrum*, Jun. 1983, pp. 30–37.

D'Avella et al, "An Adaptive MLSE Receiver for TDMA Digital Mobile Radio", *IEEE Journal on Selected Areas in Communications*, vol. 7, No. 1, Jan. 1989, pp. 122–129.

Everitt et al, "Performance Analysis of Cellular Mobile Communication Systems with Dynamic Channel Assignment", *IEEE Journal on Selected Areas in Communications*, vol. 7, No. 8, Oct. 1989, pp. 1172–1180.

Fisher, "Dual Mode Mobile Unit for Next Generation Digital Narrow Channel Cellular Telephone System", *38th IEEE Vehicular Technology Conference*, 1988, pp. 543–547.

Goodman et al, "Packet Reservation Multiple Access for Local Wireless Communications", *IEEE Transactions on Communications*, vol. 37, No. 8, Aug. 1989, pp. 885–889.

Gupta et al, "Land Mobile Radio Systems—A Tutorial Exposition", *IEEE Communications Magazine*, Jun. 1985, vol. 23, No. 6, pp. 34–45.

Lee, "Cellular Operators Feel the Squeeze", *Telephony*, May 30, 1988, pp. 22–23.

Li, "Multiple Access Communications Networks", *IEEE Communications Magazine*, Jun. 1987, vol. 25, No. 6, pp. 41–48.

Mahmoud et al, "An Integrated Voice/Data System for VHF/UHF Mobile Radio", *IEEE Journal of Selected Areas in Communications*, vol. SAC–1, No. 6, Dec. 1983, pp. 1098–1111.

Nguyen et al, "Access Strategies for D–TASI Over Mobile Radio Channels", *IEEE Vehicular Technology Conference*, 1986, pp. 311–318.

Riordon et al, "Demand Time–Assigned Speech Interpolation for Land Mobile Systems", *International Conference on Mobile Radio Systems and Techniques*, 1984, pp. 150–154.

Schoute, "Dynamic Frame Length ALOHA", *IEEE Transactions on Communications*, vol. COM–31, No. 4, Apr. 1983, pp. 565–568.

Sheikh et al, "Performance of Access Strategies for D–TASI Over Mobile Radio Fading Channels", *Journal of the Institution of Electronic and Radio Engineers*, vol. 57, No. 6 (Supplement), Nov./Dec. 1987, pp. S304–S310.

Uddenfeldt et al, "Digital Technologies in Cellular Radio", *38th IEEE Vehicular Technology Conference*, 1988, pp. 516–519.

Yan, "Performance Analysis of Replication ALOHA for Fading Mobile Communications Channels", *IEEE Transactions on Communications*, vol. COM–34, No. 12, Dec. 1986, pp. 1256–1259.

| | 1 | 2 | 3 | 4 | 5 | 6 |
|---|---|---|---|---|---|---|
| 1 | 1 CONTROL | 2 | 3 | 4 | 5 | 6 |
| 2 | 1 | 2 CONTROL | 3 | 4 | 5 | 6 |
| 3 | 1 | 2 | 3 CONTROL | 4 | 5 | 6 |
| 4 | 1 | 2 | 3 | 4 CONTROL | 5 | 6 |
| 5 | 1 | 2 | 3 | 4 | 5 CONTROL | 6 |
| 6 | 1 | 2 | 3 | 4 | 5 | 6 CONTROL |
| 7 | 1 | 2 | 3 | 4 | 5 | 6 |
| 8 | 1 | 2 | 3 | 4 | 5 | 6 |
| 9 | 1 | 2 | 3 | 4 | 5 | 6 |
| 10 | 1 | 2 | 3 | 4 | 5 | 6 |
| 11 | 1 | 2 | 3 | 4 | 5 | 6 |
| 12 | 1 | 2 | 3 | 4 | 5 | 6 |

ONE DSI GROUP
12 RF CHANNELS
72 SLOTS
6 CONTROL SLOTS
66 USER SLOTS

FIG. 2.

FREQUENCY, TIME AND POWER LEVEL DIVERSITY SYSTEM FOR DIGITAL RADIO TELEPHONY

This is a continuation of application Ser. No. 07/622,243 filed Dec. 6, 1990, now abandoned.

FIELD OF THE INVENTION

The invention relates to radio communicates in fading and/or shadowed channels, such as are found, for example in mobile telephone service.

RELATED APPLICATION

This application is related to U.S. Pat. No. 5,299,198, filed simultaneously herewith, entitled "Method and Apparatus for Exploitation of Voice Inactivity to Increase the Capacity of a Time Division Multiple Access Radio Communications System", and assigned to the assignee of this application. The disclosure of the co-pending application is incorporated herein by this reference.

BACKGROUND ART

The operation of mobile telephone systems now in existence can be segregated into an initial phase of call set up and a conversational phase which occurs after call set up has been completed. In the conversational phase, an air (radio) channel has been dedicated for the purposes of the conversation. On the other hand, in the set up phase the channel which is typically employed (at least for the mobile-to-base direction) relies on a contention scheme such as Aloha. Because the initial or set up phase occurs prior to either party initiating conversation, delays (even on the order of several hundred milliseconds) are not particularly critical since there is no danger of losing speech.

In the cross-referenced application, however, a mobile telephone service is described which does not dedicate an air (radio) channel for the duration of a conversation. Rather, an air (radio) channel is only provided for the duration of a speech spurt so that when each new speech spurt is detected, a process of channel allocation is required. Since this process of course cannot begin until the speech spurt has been detected, minimizing delays in allocating the channel are essential.

Aside from contention factors, delay can be occasioned by the phenomena of fading or shadowing. Furthermore, the fading can be either flat or frequency selective.

The published literature evidences previous suggestions for the use of dynamic channel assignment in the mobile telephone service on a speech spurt basis. See Al-Salihi, "The Application of Time Assignment Speech Interpolation (TASI) to the Radio Phone Service", from the *Colloquium on Radio System Organization and Control,* 1980; Sheikh, "Performance of Access Strategies for D-TASI Over Mobile Radio Fading Channels", in the *Journal of the Institution of Electronic and Radio Engineers,* Vol. 57, No. 6, November/December 1987; Nguyen, "Access Strategies for D-TASI Over Mobile Radio Channels", from the 36*th IEEE Vehicular Technoloay Conference,* 1986 and Riordon, "Demand Time-Assigned Speech Interpolation for Land Mobile Systems", from the *International Conference—Mobile Radio Systems and Techniques,* 1984.

While these publications mention the importance of minimizing delays and the fact that delays can be caused by contention and/or fading, they propose to use relatively conventional Aloha techniques of retransmission in the face of a lack of acknowledgement. More recently, Goodman, "Packet Reservation Multiple Access for Local Wireless Communications", from the *IEEE Transactions on Communications,* Vol. 37, No. 8, August 1989, proposes a scheme to eliminate the necessity for allocation requests and acknowledgements by actually transmitting the first speech spurt packet using contention protocols and operating on the basis that successful transmission of the first speech spurt packet prohibits each other terminal from using that particular slot until it becomes empty at the termination of the spurt. Goodman also describes using conventional Aloha retransmission in the absence of acknowledgement protocols in order to gain initial access.

SUMMARY OF THE INVENTION

It is an object of the invention to provide for minimizing delays in successfully transmitting a message over a fading or shadowed error-prone channel. It is another object of the invention to increase the probability of transmitting a message across such a fading or shadowed error-prone channel without accepting delays occasioned by waiting for an acknowledge and/or random back off for retransmission, such as is conventional in Aloha protocols.

Typically, in a mobile telephone system, there are a plurality of carrier frequencies available to both the mobile station as well as the base station. In the analog AMPS arrangement, different traffic channels exist on different carrier frequencies. In the proposed AMPS-D (for dual), the digital portion of the system also exhibits plural carrier frequencies, each of which are time divided using time division multiple access techniques, so that multiple traffic channels each exist on separate ones of the plurality of carrier frequencies.

In accordance with the present invention, each time a control message is to be transmitted, it is transmitted in multiple forms, and at different times. For example, in a preferred embodiment of the invention, each control message is transmitted on at least three different occasions. Furthermore, the replicated control messages are transmitted on different carrier frequencies.

Using as an example for explanatory purposes, the digital portion of the AMPS-D standard provides plural radio channels on a single carrier frequency by dividing time into a succession of periodic frames and subdividing the frame into a plurality of slots, each of equal duration. Each different slot comprises a separate channel. A speech packet can be transmitted once per frame in each slot. Typically, a mobile or base station has access to a plurality of carriers, each of which is divided as described. In accordance with the invention, however, each of these slots (a channel) is further subdivided for the purpose of transmitting control messages into four subslots (in the mobile-to-base direction). When a message is to be transmitted, the mobile randomly chooses one subslot in a slot for a transmission. The transmission is repeated several times in other subslots. By this technique, the message is protected by time diversity. Furthermore, a second transmission is implemented on a different carrier frequency from the first and a third transmission will be effected on a carrier frequency which is different from both the first and the second. In this fashion, the message is protected by frequency diversity. Finally, the message may be transmitted on each of these occasions at a different power level. Accordingly, such a message is protected by time, frequency and power diversity.

In contention channels, the probability of success $P_s$ is related to $e^{-G}$, where G is related to the total channel load.

By using multiple transmissions or diversity, the probability of success is increased to $1-(1-e^{-KG})^K$, where K is the number of diversity transmissions (K>2). However, over and above the improvement related by the foregoing, frequency diversity gives the added advantage that multipath (frequency-selective) fades will not affect distant frequencies at approximately the same time. Accordingly, transmission on a frequency F1 followed by a transmission on a frequency F2 in the next 6–12 ms (where the slot duration is on the order of 6 ms) are very likely to be uncorrelated, i.e. if one message fails, the other one will not. This diversity works in the Rayleigh (flat or non-frequency selective) fading depending on the speed of the vehicle. It is unlikely that successive 6 ms time slots will encounter deep fades when the vehicle is moving.

Varying the power level also serves to increase the probability of success beyond that indicated by the number of multiple transmissions. This factor is related to the capture phenomenon. More particularly, when the transmitting sources (such as the mobiles) are at differing distances from the base station, even if they transmit at identical power levels, the energy received at the base station antenna will vary depending on the distance from the transmitter. Under some circumstances, simultaneously received transmissions will not be garbled and lost if one is sufficiently higher in power than another so that the receiver is "captured". By transmitting different copies of the message at different power levels, the probability of the capture phenomenon assisting the transmission is increased.

Accordingly, the invention provides a method of transmission over fading or shadowed, error-prone, framed, random access channels comprising the steps of:

(a) transmitting a given message at least on n different occasions in time so that there are n transmissions of said given message, where n is an integer no less than 2, and (b) using for each transmission of step (a) a carrier frequency which differs from the carrier frequency used on another occasion of the transmission of the given message, whereby said given message is protected by time and frequency diversity.

BRIEF DESCRIPTION OF THE DRAWINGS

The present invention will now be described in further detail in the following portions of this specification when taken in conjunction with the attached drawings, wherein;

FIG. 2 illustrates a DSI traffic pool showing a plurality of carrier frequencies, each of which are time divided into multiple slots, wherein several of the slots in the frame are dedicated for control purposes;

DETAILED DESCRIPTION OF A PREFERRED EMBODIMENT

Figure 1:
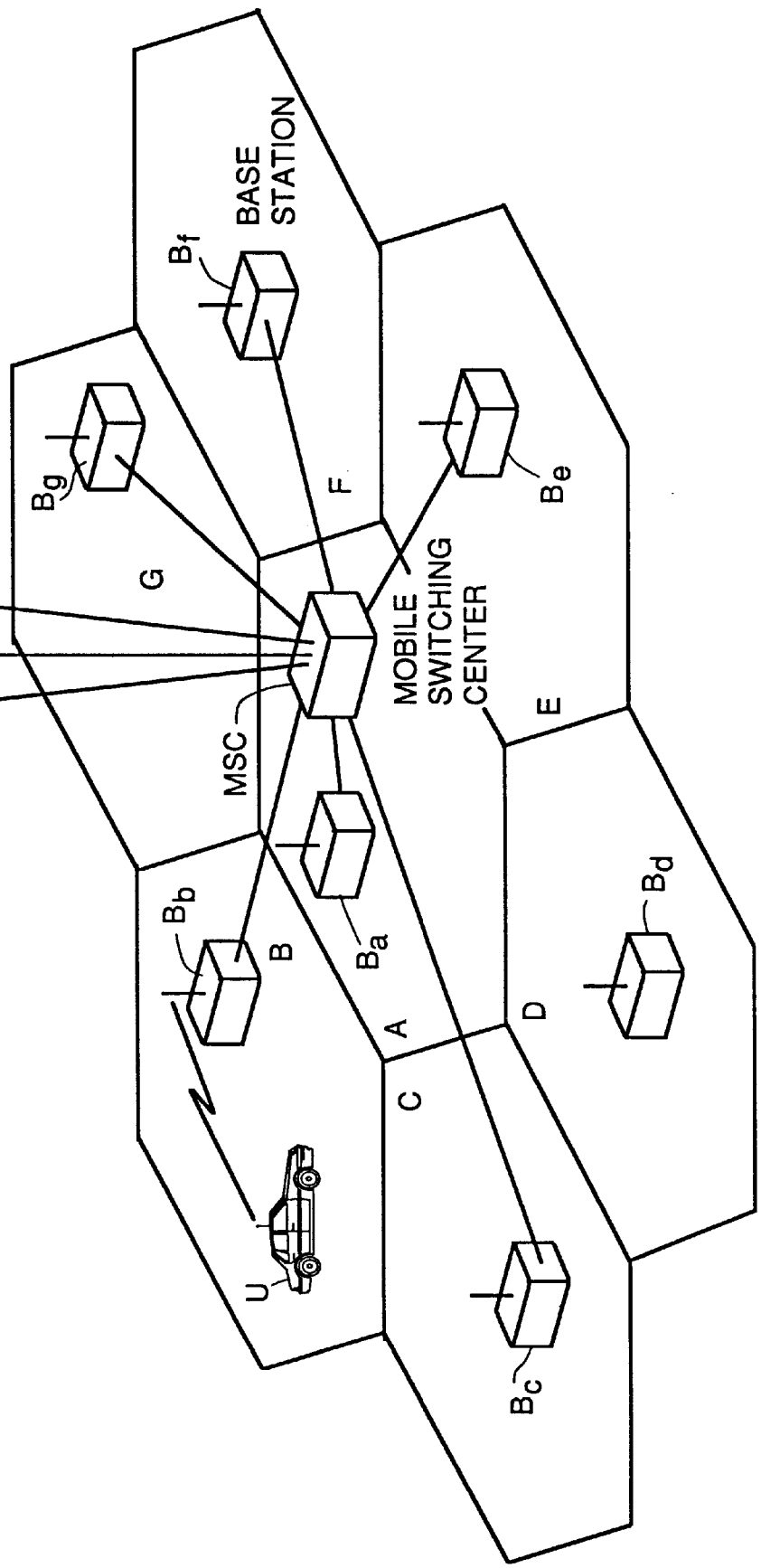
FIG. 1 is a schematic illustration of a conventional mobile telephone system.

FIG. 1 schematically shows a typical mobile telephone system wherein the region which is served is divided into a plurality of cells A–G. Each cell is served by a base station including transmit/receive radio frequency equipment and an interface to Mobile Switching Center (MSC). The base stations and MSC are interconnected typically by land links and the MSC in turn is connected to the Public Switched Telephone Network (PSTN). The mobile user U can be connected to the PSTN via the concatenation of (1) an air (radio) link between the user and the base station and (2) the wire link between the base station and the MSC. These links can complete a telephone circuit which can support a normal telephone conversation between the user U and another person using a conventional telephone connected to the PSTN. The air (radio) link between the base station and the user U occupies (at least at times) a traffic channel or user slot which is selected from a pool of available slots. Since the conversation may require, at different times, voice to be transmitted from the user U to the PSTN, and at other times from the PSTN to the user U, the conversation may be supported (at the same or different times) by a forward channel (from base station to user U) and a reverse channel (from the user U to the base station). The channel which is used is selected from a pool which is subdivided into a forward and reverse pool. FIG. 2 shows an example of either a forward or a reverse pool which encompasses twelve different carrier frequencies, each carrier frequency supporting six different slots or channels in a TDMA protocol. In FIG. 2 several of the slots are shaded to indicate that they are dedicated for control purposes, i.e. for passing messages back and forth. This dedication of six slots leaves 66 user slots or channels available for carrying voice traffic. Those skilled in the art will understand that the selection of six of 72 slots for control purposes is exemplary and the number of control slots or channels can be increased or decreased as necessary. In an example of a preferred embodiment, each slot of FIG. 2 occupies 6.67 ms and the frame (encompassing slots 1–6) occupies 40 ms.

Figure 3:
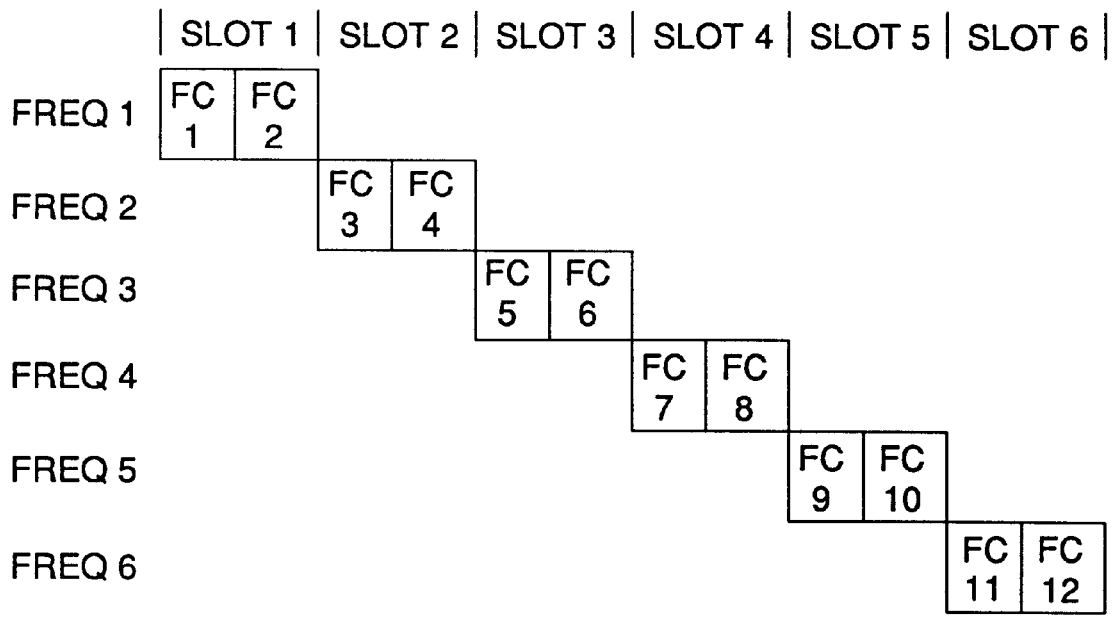
FIG. 3 illustrates how forward control channels, which each comprise a sub-slot, are located at different points in time and at a plurality of different carrier frequencies in a frame.

An entire slot or channel, when in use, is dedicated to a particular conversation for at least the duration of a talk spurt. On the other hand, control channels (whether in the forward or reverse direction) are subdivided. FIG. 3 shows how the forward slots are subdivided. As shown in FIG. 3, within each 6.67 ms slot time, there are two forward control channels (FC). In addition, over a single frame there are, as is seen in FIG. 3, twelve forward control channels FC1 through FC12.

Figure 4:
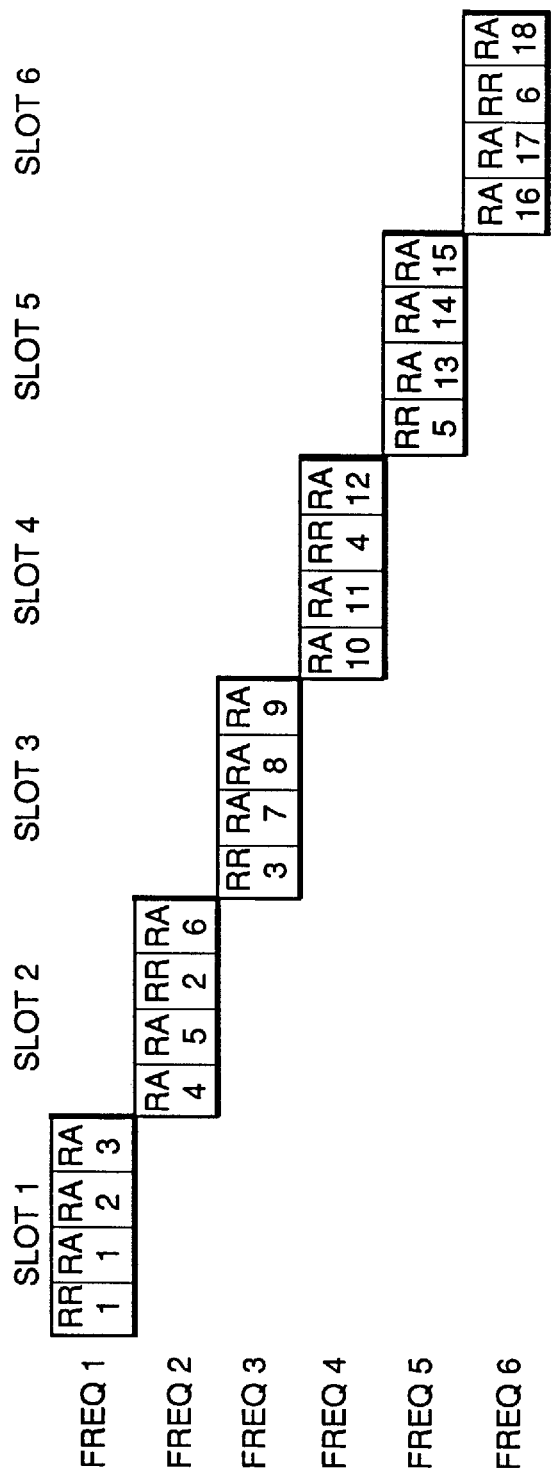
FIG. 4 is a similar illustration for the reverse control channels or sub-slots.

In the case of the reverse direction (mobile to base), the 6.67 ms slot is subdivided into four subslots as shown in FIG. 4. Three of the four subslots of each slot, as shown in FIG. 4, allow access based on contention, i.e. RA1–RA18. The other component of each slot is the Reverse Response subslot (RR) which is accessed on command and is therefore not a contention access channel.

Figure 5:
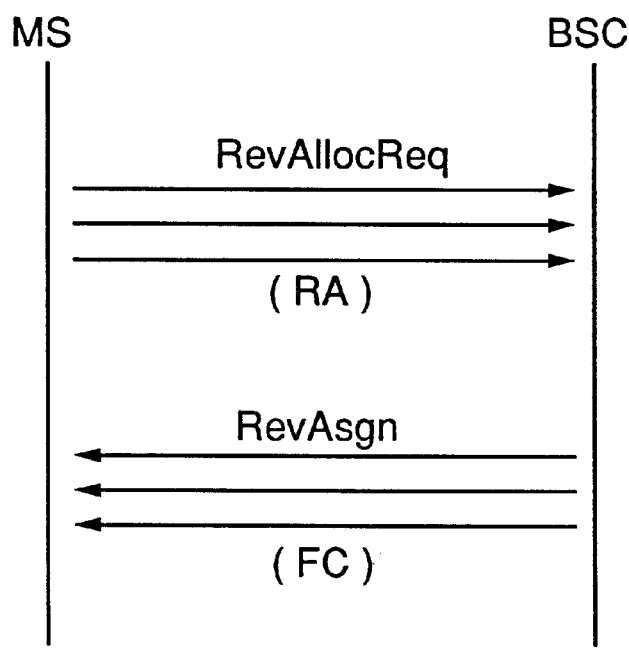
FIG. 5 illustrates a typical exchange between a mobile and a base station comprising a reverse allocation request and a reverse assignment.

When a call must be completed either to or from a mobile, a call set up phase is entered whereby the mobile and base station cooperate to locate and identify the called mobile. It should be noted that at the termination of the call set up phase, there is no traffic channel dedicated to either the user or the conversation, i.e. none of the 66 slots per pool are in use to support this conversation. When the mobile detects the initiation of a speech spurt, a reverse allocation request is transmitted using the RA (reverse Aloha) channels in a manner to be described. More particularly, the reverse allocation request is sent on three different times, at three different carrier frequencies, and on each transmission the power level is randomly selected. This triply redundant message transmission is illustrated in FIG. 5. FIG. 5 also shows that once the base station has located a traffic channel which the mobile can use for the transmission of the speech spurt, that assignment is transmitted back to the mobile, also in a triply redundant fashion.

More particularly, and referring to FIG. 4, assume that the mobile has identified the initiation of a speech spurt just prior to the beginning of the frame which is illustrated. In one embodiment, the mobile would then randomly select an RA subslot from slot 1, an RA subslot from slot 2 and an RA subslot from slot 3. It should be apparent from FIG. 4 that each of these subslots is carried on a different carrier frequency, and each occurs at a different instant in time. However, use of the first three available slots for the control message is not essential. Performance management (trading off increased delay for increased probability of successful transmission) may be implemented by randomly selecting subslots in the first three pairs of available subslots, etc.

Figure 6:
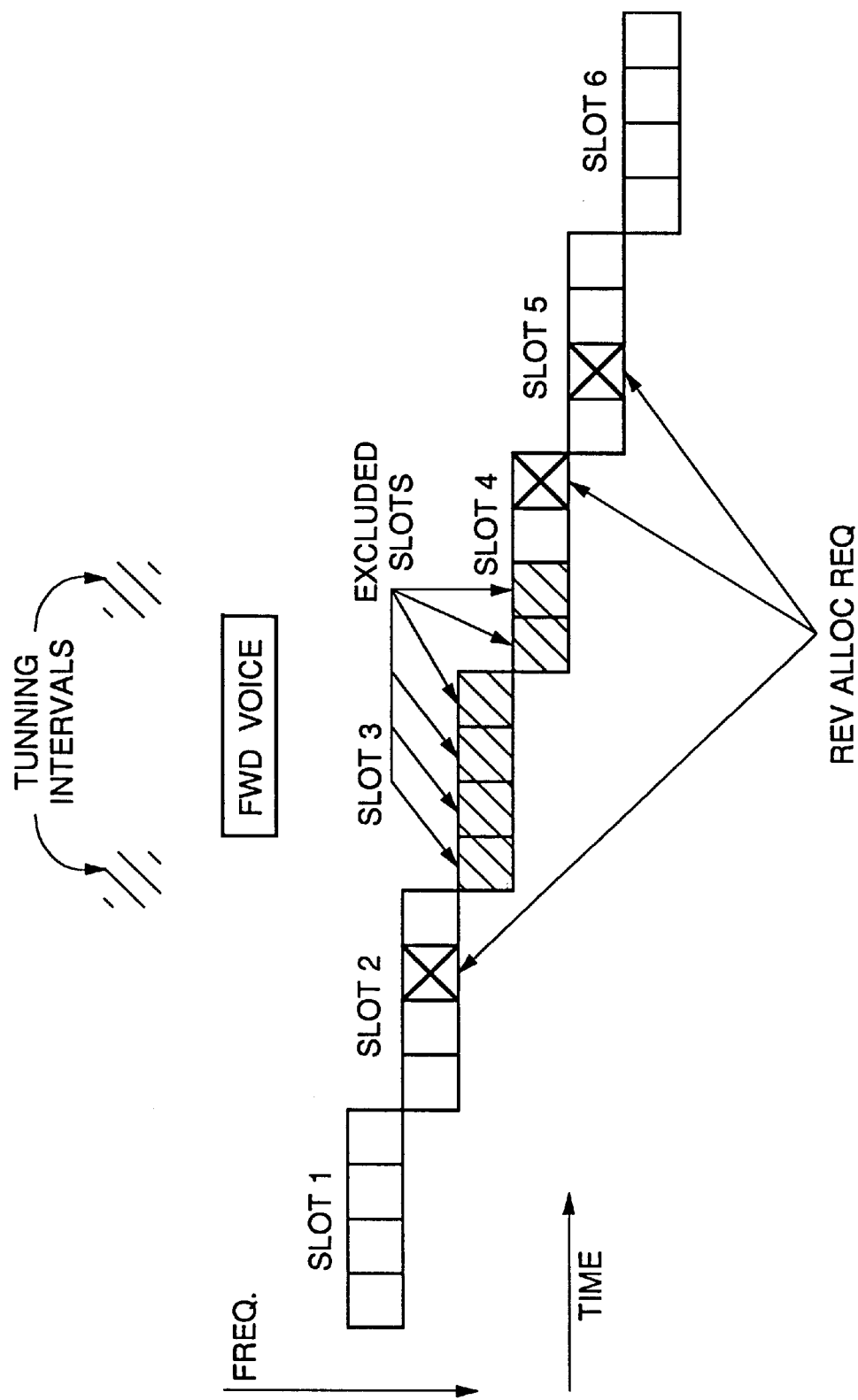
FIG. 6 illustrates how several of the potential reverse control sub-slots are excluded because of a forward traffic assignment to the mobile.

As is described in the copending application, each mobile has an identification, and each mobile can only access the even or odd subslots of the forward control channels based on its identification. For example, an "odd" mobile could only access FC1, FC3, FC5, FC7, FC9 or FC11 in a given frame. If we assume therefore that the base station has located a channel in response to the mobile's reverse allocation request of FIG. 5, then as shown in FIG. 5, the reverse channel assignment is transmitted on three different occasions. For this transmission, the base cannot randomly select a subslot, but rather is forced to select the subslot which corresponds to the mobile's identification. Accordingly, if the base station selects slots 1, 2 and 3 in which to transmit the reverse assignment to the mobile then (and again assuming the mobile is an odd mobile) the reverse assignment is transmitted in FC1, FC3 and FC5. As is apparent from FIG. 3, these three different subslots occur on three different frequencies and occur at three different points in time. Under some circumstances, as will be described in connection with FIG. 6, the mobile's selection of RA subslots for transmission of a reverse allocation request is constrained. In FIG. 6, where frequency varies vertically and time advances from left to right, the six control slots of a frame are illustrated. FIG. 6 also shows that the particular mobile in question is receiving a forward voice spurt at that point in time and frequency space shown by the block labelled FWD VOICE. In addition, in order to receive that packet, the mobile is constrained to tune to the appropriate frequency and thus during the interval which is shaded and labelled "tuning intervals" the mobile is either tuning to or tuning from the carrier associated with the traffic channel shown in FIG. 6. As a consequence, the subslots which are shaded and labelled "excluded slots" cannot be used by the mobile for transmission of its reverse allocation request. Accordingly, and as shown in FIG. 6, the mobile has selected an RA subslot in slot 2 and RA subslots in slots 4 and 5 for the transmission. Although the triply redundant transmission has thus been delayed somewhat, it should be apparent that in the case of FIG. 6, three different transmissions of the reverse allocation request are implemented, each request occurs at a different instant in time, and is carried by a different carrier frequency.

Figure 7:
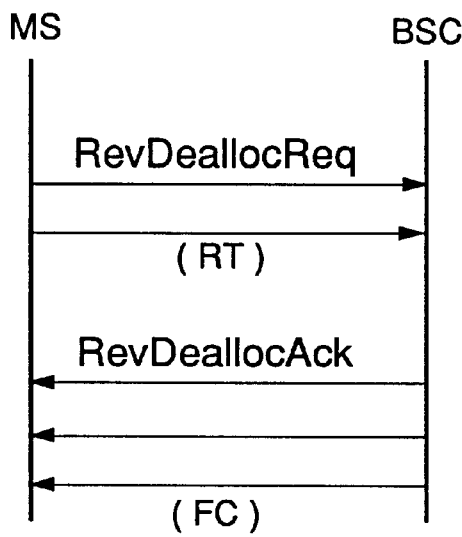
FIGS. 7 and 8 illustrate two different variations of the reverse deallocation request and reverse deallocation acknowledgement.
Figure 8:
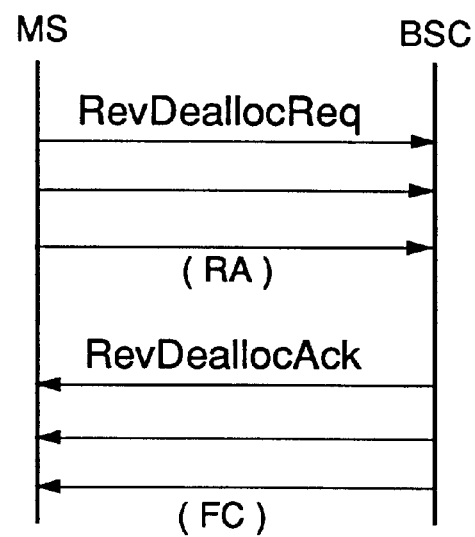

FIGS. 7 and 8 show additional examples of the use of multiple diversity for control messages. In FIG. 7 a reverse deallocation request and response is illustrated. The upper portion of FIG. 7 shows two messages on the RT channel (which is a traffic, as opposed to a control, channel) carrying a reverse deallocation request. As described in the copending application, the reverse deallocation request is carried along with the last two transmissions of speech. The lower portion of FIG. 7 shows the response from the base station to the mobile, i.e. the reverse deallocation acknowledgement. Because it is important to minimize the load on the contention channels (RA in particular) the reverse deallocation acknowledgement is sent with diversity over the forward control channel (FC). More particularly, as is also described in the copending application, forward control channels each comprise a half slot such that a given slot (which is equivalent to a traffic channel) carries two forward control channels. The forward control channels are numbered and typically a frame might include twelve forward control channels, e.g. FC1–FC12. As is also described in the copending application, a given mobile will access either the even or the odd forward control channels so that for example the three transmissions shown in the lower portion of FIG. 7 will all be accomplished either on an even forward control channel or an odd forward control channel. Furthermore, by reference to FIG. 3 it should be apparent that any such three transmissions will (1) occur at a point in time unique from the other two transmissions and (2) a carrier frequency which is unique with respect to the other two transmissions. In other words, the reverse deallocation acknowledgement is protected by time and frequency diversity.

FIG. 8 shows the example of a reverse deallocation request which is carried on the Reverse Aloha (contention access) channel. The scenario shown in FIG. 8 would typically be caused by the lack of a reverse deallocation acknowledgement from the base station in response to a previously transmitted reverse deallocation request. Accordingly, the reverse deallocation request which is now repeated (as shown in FIG. 8) takes place over the Reverse Aloha channel as opposed to the reverse traffic channel. FIG. 8 again illustrates that the reverse deallocation request is triply redundant. More particularly, each transmission shown at the top of FIG. 8 occurs at a unique point in time with respect to the other two transmissions, at a unique carrier frequency and preferably with a different power level. The lower portion of FIG. 8 shows again the reverse deallocation acknowledgement carried on the forward control channel which is substantially identical to the similar reverse deallocation acknowledgement shown in FIG. 7.

Figure 9:
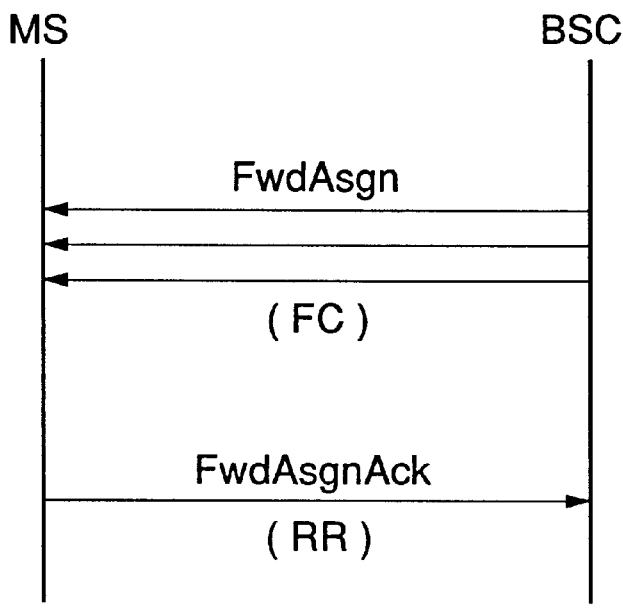
FIG. 9 illustrates an example of a forward assignment and forward assignment acknowledgement exchange.

FIG. 9 is another example of the use of time and frequency diversity, in this case in the forward assignment. The forward assignment is an assignment which is created and transmitted by the base station when a speech spurt originating with the land line portion of the communications system is detected. The base station transmits the forward assignment to cause the mobile to tune to the appropriate carrier frequency and slot to receive the speech spurt transmission. The forward assignment is triply redundant. Inasmuch as the forward assignment is transmitted to a mobile, the forward channels are either even or odd and a mobile tunes to either an even or odd control channel, the three forward assignment transmissions are (1) transmitted at a point in time different from the transmission of the other two forward assignments and (2) transmitted at a different carrier frequency.

Figure 10:
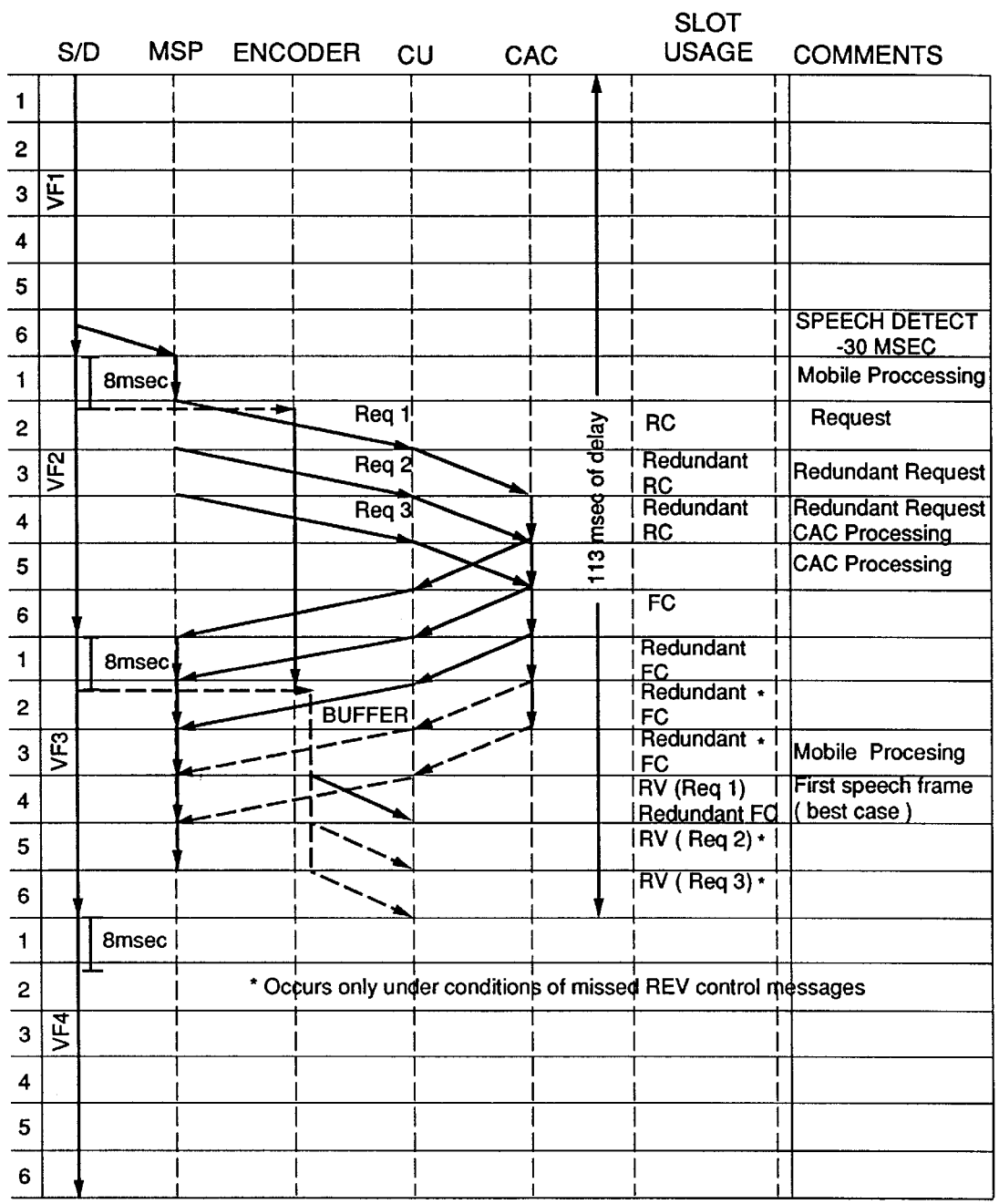
FIGS. 10 and 11 illustrate respectively reverse allocation timing and forward allocation timing.
Figure 11:
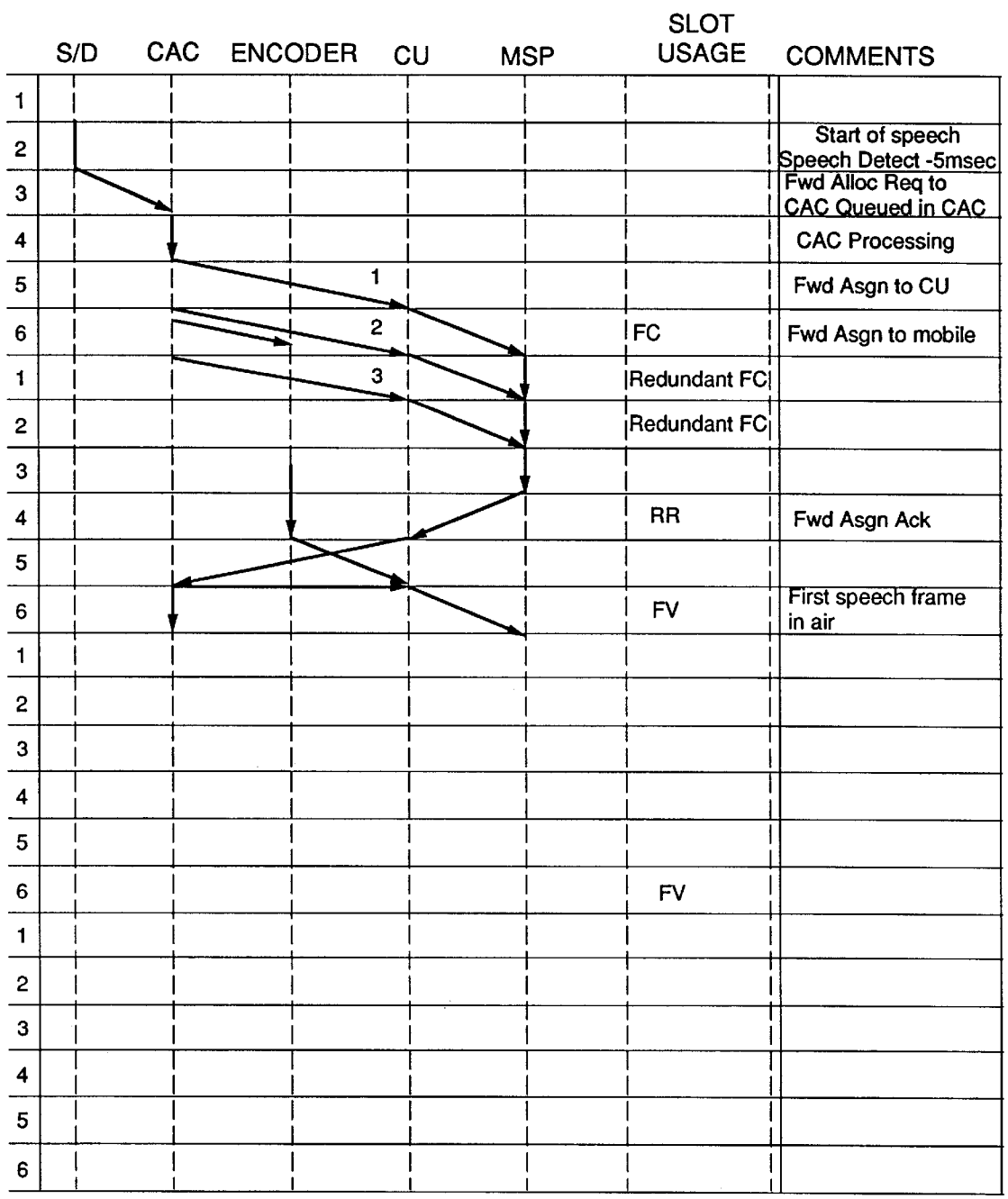

FIG. 10 illustrates the timing of the reverse allocation process, whereas FIG. 11 illustrates the timing of the forward allocation process. As shown in FIG. 10 speech is detected at the mobile (S/D) at some point in time within VF1 (the voice frame #1). Detection of speech initiates a sequence of operations at the Mobile Speech Processor and Encoder, causing the triple transmission of a reverse allocation request (identified in FIG. 10 as Req1, Req2 and Req3). FIG. 10 shows that the different requests are transmitted at different instants in time to the Channel Unit (of the base station). While each of the requests may be transmitted in any RA subslot of the selected slot, FIG. 10 only shows the transmission at the end of the slot. This is solely for illustration convenience and it will be understood that in fact the requests may be distributed within the slot. In response to receipt of a reverse allocation request, the base station (particularly the Channel Access Controller) formulates an assignment and transmits the same back to the mobile (MSP). This assignment is then used at the mobile in order to transmit the processed (encoded) speech. As shown in FIG. 10, and assuming the CAC responded to the Req1, and the assignment message resulting from that response was properly received at the mobile, speech will be transmitted from the mobile to the base station in slot 4 of the frame identified as VF3. Of course, that speech transmission would be delayed if the CAC did not properly receive the first Req and/or if the mobile did not properly receive the first of the reverse assignments.

FIG. 11 is a similar figure illustrating a forward assignment. More particularly, the base station detects speech (S/D) originating with the land line communications system. This detection results in the formulation of a forward assignment which is transmitted (from the base station Channel Unit) to the mobile within the first slot time 6 shown in FIG. 11. It will be understood that since the forward control is a subslot, the showing of the assignment at the end of the slot is solely for convenience in illustration. However, further forward assignments are transmitted in slots 1 and 2 of the succeeding frame. It should be apparent from FIG. 11 that these three transmissions (labelled 1, 2 and 3 in FIG. 11) occur at different instants in time. As has already been explained, they also occur on different carrier frequencies, thus illustrating the use of time and frequency diversity.

In accordance with a preferred embodiment, the random power selection is used only at the mobile. The limits within which the power is selected is predetermined and, prior to any transmission, power is randomly selected between those limits.

While the foregoing specification describes a preferred embodiment of the invention, those skilled in the art will appreciate that many changes can be made within the spirit and scope of the invention. More particularly, while in the example described herein, the diversity transmissions are used for dynamic control of voice traffic channels in a mobile telephone system, the invention can be applied to dynamic control of any type of bursty traffic such as data, facsimile, etc. Accordingly the scope of the invention should be construed in accordance with the claims appended hereto.

I claim:

1. A method for transmitting messages on any of a predetermined plurality of different carrier frequencies comprising:
   transmitting a particular message from one station to another station at a first power level, at a first time and on a first carrier frequency; and
   transmitting the particular message at a second different power level, at a second different time and on a second different carrier frequency,
   wherein the first and second transmission frequencies are selected substantially at random from among the different carrier frequencies of the plurality.

2. A method for transmitting messages on any of a predetermined plurality of different carrier frequencies comprising:
   transmitting a particular message from one station to another station at a first power level, at a first time and on a first carrier freguency; and
   transmitting the particular message at a second different power level, at a second different time and on a second different carrier frequency,
   wherein the first and second transmission times are selected substantially at random from among a range of acceptable transmission times.

3. A method for transmitting messages on any of a predetermined plurality of different carrier frequencies comprising:
   transmitting a particular message from one station to another station at a first power level, at a first time and on a first carrier frequency; and
   transmitting the particular message at a second different power level, at a second different time and on a second different carrier frequency,
   wherein the first and second power levels are selected substantially at random from among a range of acceptable power levels.

4. A method for transmitting messages on any of a predetermined plurality of different carrier frequencies comprising:
   transmitting a particular message from one station to another station at a first power level, at a first time and on a first carrier frequency; and
   transmitting the particular message at a second different power level, at a second different time and on a second different carrier frequency,
   wherein each of the plurality of carrier frequencies comprises a plurality of time slots, and wherein transmitting the message at a plurality of different times comprises transmitting the message in a plurality of different slots, and
   wherein the step of transmitting a particular message comprises transmitting a slot assignment for identifying a particular slot and further comprising the step of transmitting an information packet in the identified slot, and wherein each slot comprises a plurality of subslots, the slot assignment being carried in a subslot of a slot which does not carry the information packet.

5. In a radio telephony system having a plurality of transmitting stations for transmitting information packets to other stations, wherein each information packet is transmitted in one of a plurality of carrier frequency channel slots and wherein some of the slots carry control messages independently of the information packets for controlling the transmission of the information packets between stations, a method for transmitting the control messages comprising:
   transmitting a particular control message independently of any information packet from one station to another station in a first slot at a first time and a first carrier frequency the particular control message relating to a particular information packet; and
   transmitting the particular control message independently of any information packet in a second slot at a second different time and a second different carrier frequency; and transmitting the particular information packet in a third slot.

6. The method of claim 5 further comprising transmitting the particular control message in a fourth slot at a third different time and a third different frequency.

7. The method of claim 5 wherein the steps of transmitting the particular control message comprise transmitting the control message at first and second different power levels, respectively.

8. The method of claim 7 wherein the first and second power levels of the particular control message are selected substantially at random from among a range of acceptable power levels.

9. The method of claim 5 wherein the first and second frequencies are selected substantially at random from among the different carrier frequency channels of the plurality.

10. The method of claim 5 wherein the first and second transmission times of the particular control message are selected substantially at random from among a range of acceptable transmission times.

11. A method for transmitting an information burst from a controlling radio telephony station to a controlled radio telephony station comprising:

detecting the burst for transmission from the controlling station to the controlled station;

transmitting, independently of the burst, on a plurality of predetermined carrier frequency channels at a plurality of different times, a radio channel assignment to the controlled station for indicating to the controlled station the channel upon which the burst will be transmitted; and transmitting the burst on the indicated channel from the controlling station to the controlled station.

12. The method of claim 11 wherein each of the plurality of carrier frequency channels comprises a plurality of time slots, and wherein transmitting the channel assignment at a plurality of different times comprises transmitting the channel assignment in a plurality of different slots.

13. The method of claim 12 wherein each slot comprises a plurality of subslots, the burst typically being carried in a slot while the channel assignment is carried in subslots of slots which do not carry the burst and wherein the channel assignment identifies the slot which carries the burst.

14. The method of claim 13 comprising transmitting additional channel assignments corresponding to additional bursts in additional ones of the plurality of subslots and transmitting the additional bursts in additional ones of the plurality of slots and wherein each subsiot of a slot which carries a channel assignment carries a different channel assignment corresponding to a different burst.

15. The method of claim 11 further comprising, after receipt of the burst by the controlled station:

transmitting from the controlled station to the controlling station a channel deallocation request for requesting that the channel assignment be withdrawn; and transmitting an acknowledgment from the controlling station to the controlled station for acknowledging withdrawal of the channel assignment.

16. The method of claim 15 wherein the step of transmitting the deallocation request comprises transmitting the deallocation request as a part of a second information burst.

17. A method for transmitting an information burst from a controlled radio telephony station to a controlling radio telephony station comprising:

detecting the burst for transmission from the controlled station to the controlling station;

transmitting from the controlled station, on a plurality of predetermined carrier frequency channels at a plurality of different times, a channel allocation request;

transmitting, on a plurality of predetermined carrier frequency channels at a plurality of different times, a radio assignment to the controlled station for indicating to the controlled station the channel upon which the burst will be transmitted;

transmitting the burst on the indicated channel from the controlled station to the controlling station.

18. The method of claim 17 wherein each of the plurality of carrier frequency channels comprises a plurality of time slots, and wherein transmitting the channel allocation request at a plurality of different times comprises transmitting the channel assignment in a plurality of different slots.

19. The method of claim 17 wherein each of the plurality of carrier frequency channels comprises a plurality of time slots, and wherein transmitting the channel assignment at a plurality of different times comprises transmitting the channel assignment in a plurality of different slots.

20. The method of claim 19 wherein each slot comprises a plurality of subslots, the burst typically being carried in a slot while the channel allocation request and the channel assignment is carried in subslots of slots which do not carry the burst.

* * * * *